US012439530B1

(12) United States Patent
Forbes

(10) Patent No.: US 12,439,530 B1
(45) Date of Patent: Oct. 7, 2025

(54) ENHANCED DATA-POWER SYSTEM FOR ELECTRONIC DEVICES

(71) Applicant: Pioneer Square Brands, Inc., High Point, NC (US)

(72) Inventor: Quentin Wade Forbes, Winston Salem, NC (US)

(73) Assignee: Pioneer Square Brands, Inc., High Point, NC (US)

( * ) Notice: Subject to any disclaimer, the term of this patent is extended or adjusted under 35 U.S.C. 154(b) by 0 days.

(21) Appl. No.: 19/037,832

(22) Filed: Jan. 27, 2025

(51) Int. Cl.
*H01R 33/92* (2006.01)
*H05K 5/00* (2006.01)
*H05K 5/02* (2006.01)

(52) U.S. Cl.
CPC ........... *H05K 5/0086* (2013.01); *H01R 33/92* (2013.01); *H05K 5/0247* (2013.01)

(58) Field of Classification Search
None
See application file for complete search history.

(56) References Cited

U.S. PATENT DOCUMENTS 7,663,866 B2 * 2/2010 Lee ........................ H01R 24/22 361/601
8,043,122 B1 * 10/2011 Cho ..................... H01R 31/005 439/639
9,515,501 B2 * 12/2016 Ota ........................ H02J 7/0045
9,857,842 B2 * 1/2018 Eliyahu ................. G06F 1/1632
9,979,147 B1 * 5/2018 Huang ............... H01R 13/7175
10,678,302 B1 * 6/2020 Shipman, Jr. ............. G06F 8/65
11,614,776 B2 * 3/2023 DeCamp .............. F16M 11/041 361/679.41
11,669,128 B1 * 6/2023 Troedson .............. G06F 1/1632 361/679.41
2009/0278495 A1 * 11/2009 Kaye ..................... H02J 7/0044 320/114
2010/0078470 A1 * 4/2010 DalPorto .............. G11B 33/128 235/375
2013/0279093 A1 * 10/2013 Kim ........................ G06F 1/166 361/679.01
2014/0111934 A1 * 4/2014 Chang ................... G06F 13/382 361/679.41
2018/0165053 A1 * 6/2018 Kuo ...................... G06F 3/1454
2018/0198248 A1 * 7/2018 Sun ...................... H01R 31/065
2019/0204882 A1 * 7/2019 Tseng ...................... G06F 1/266
2019/0341714 A1 * 11/2019 Du ....................... H01R 13/502
2020/0235538 A1 * 7/2020 Liao ....................... H01R 31/02
2022/0029367 A1 * 1/2022 Lee ........................ H01R 13/72
2024/0361804 A1 * 10/2024 Li ......................... G06F 1/1632

* cited by examiner

*Primary Examiner* — Xanthia C Relford
*Assistant Examiner* — Xanthia C Cunningham
(74) *Attorney, Agent, or Firm* — Grandview Law PLLC

(57) ABSTRACT

A system for at least one portable electronic device includes (I) at least one data-power port; (II) a data-only port electrically coupled to the at least one data-power port; and (III) an electrical power-only port electrically coupled to the at least one data-power port, wherein the at least one data-power port, the data-only port, and the electrical power-only port are structurally separate from one another. Other aspects are described in the claims, drawings, and text forming a part of the present disclosure.

20 Claims, 18 Drawing Sheets

50a
50b
50c
50d
50e
20
50
80
30

ENHANCED DATA-POWER SYSTEM FOR ELECTRONIC DEVICES

In addition to the foregoing, other aspects are described in the claims, drawings, and text forming a part of the disclosure set forth herein. Various other aspects are set forth and described in the teachings such as text (e.g., claims and/or detailed description) and/or drawings of the present disclosure. The foregoing is a summary and thus may contain simplifications, generalizations, inclusions, or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

For a more complete understanding of implementations, reference now is made to the following descriptions taken in connection with the accompanying drawings. The use of the same symbols in different drawings typically indicates similar or identical items, unless context dictates otherwise.

With reference now to the figures, shown are one or more examples of Enhanced Data-Power System for Electronic Devices, articles of manufacture, compositions of matter for same that may provide context, for instance, in introducing one or more processes and/or devices described herein.

DETAILED DESCRIPTION

Figure 1:
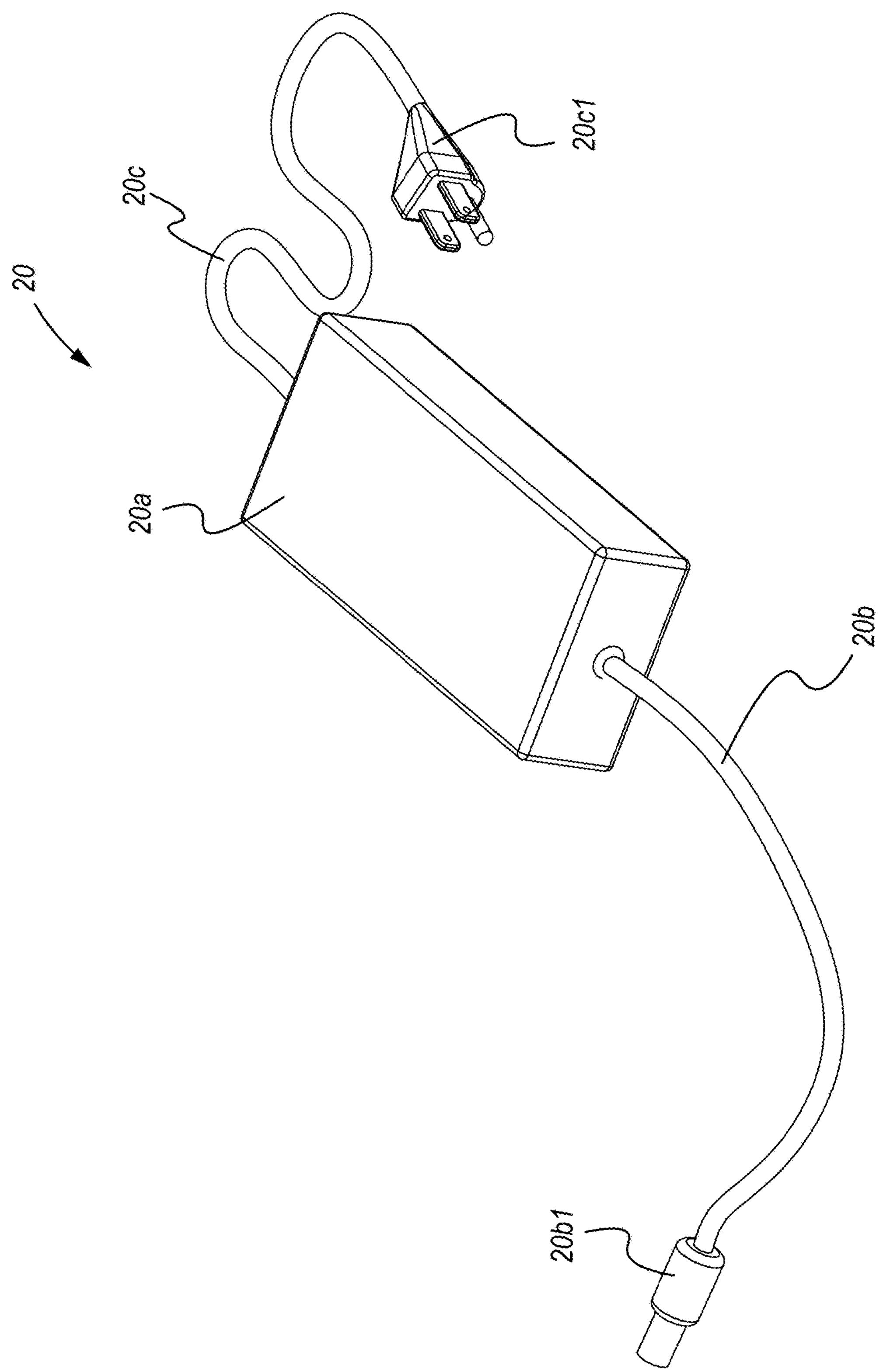
FIG. 1 is a top perspective view of a power adapter.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here.

Turning to FIG. 1, depicted therein is a top perspective view of a power adapter 20 including power brick 20*a*, DC power cord 20*b* with DC plug 20*b*1, and AC power cord 20*c* with AC plug 20*c*1.

Figure 2:
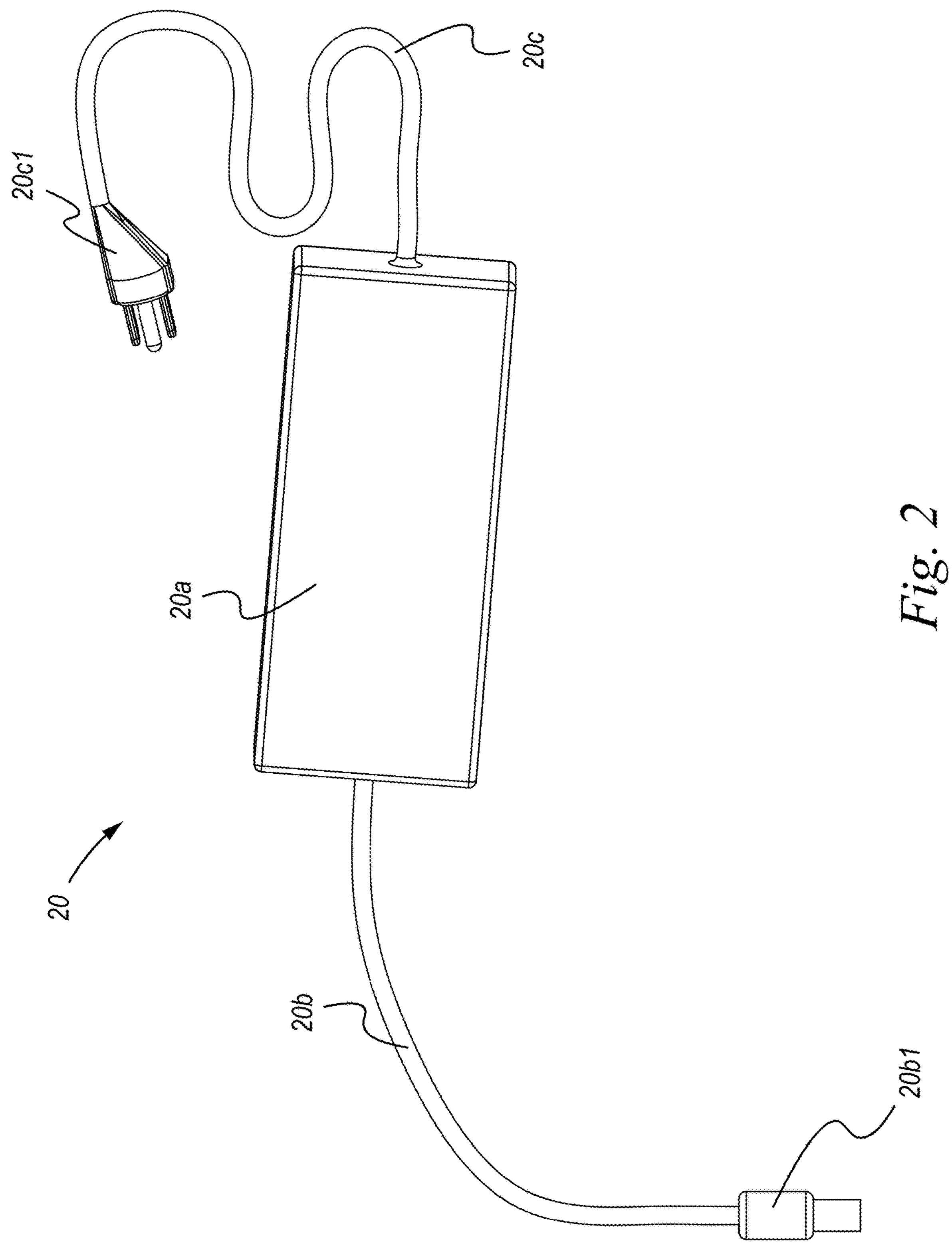
FIG. 2 is a top plan view of the power adapter of FIG. 1.

Turning to FIG. 2, depicted therein is a top plan view of power adapter 20.

Figure 3:
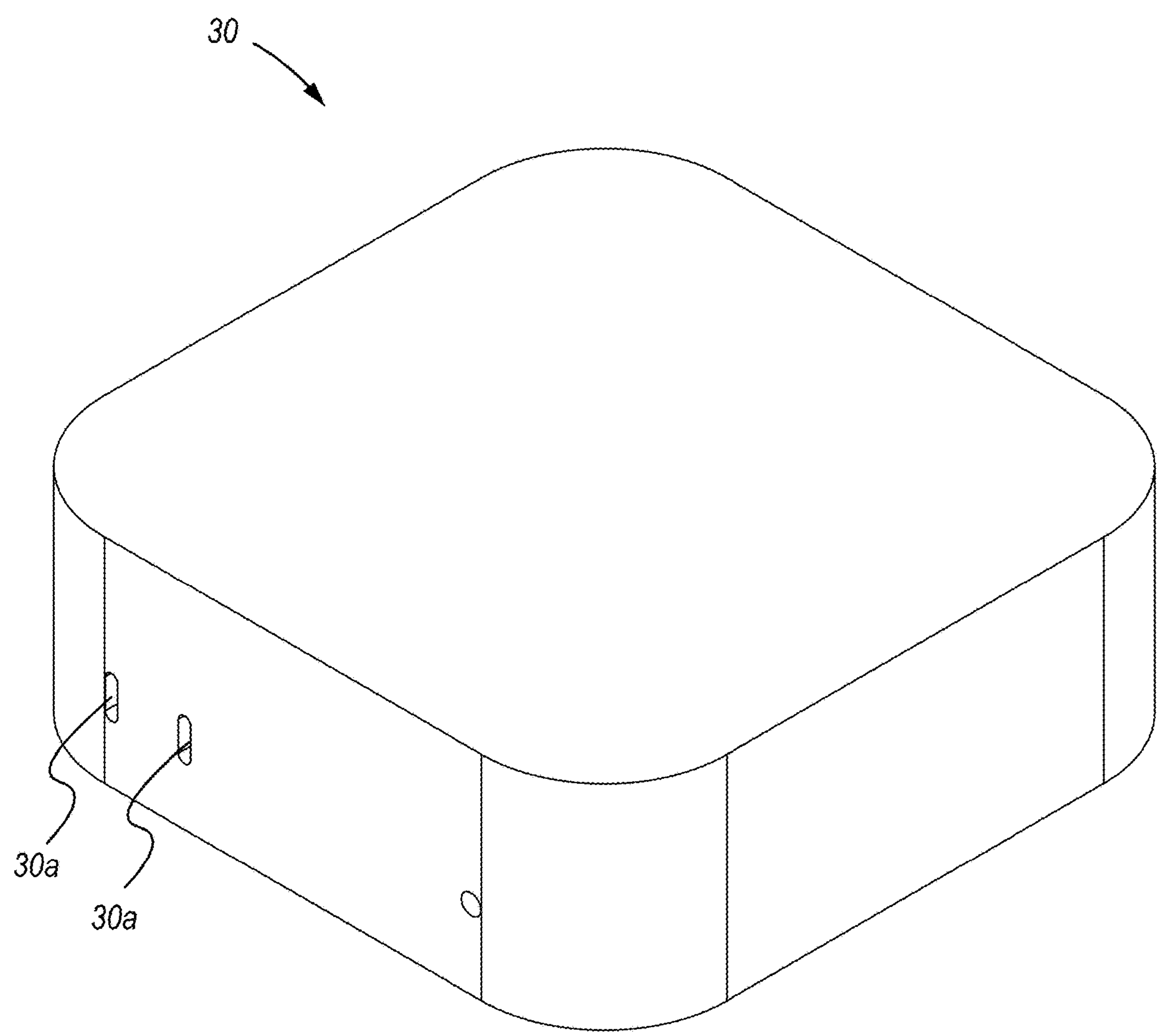
FIG. 3 is a front perspective view of a computer assembly.

Turning to FIG. 3, depicted therein is a front perspective view of computer assembly 30 with elongated member 30*a*.

Figure 4:
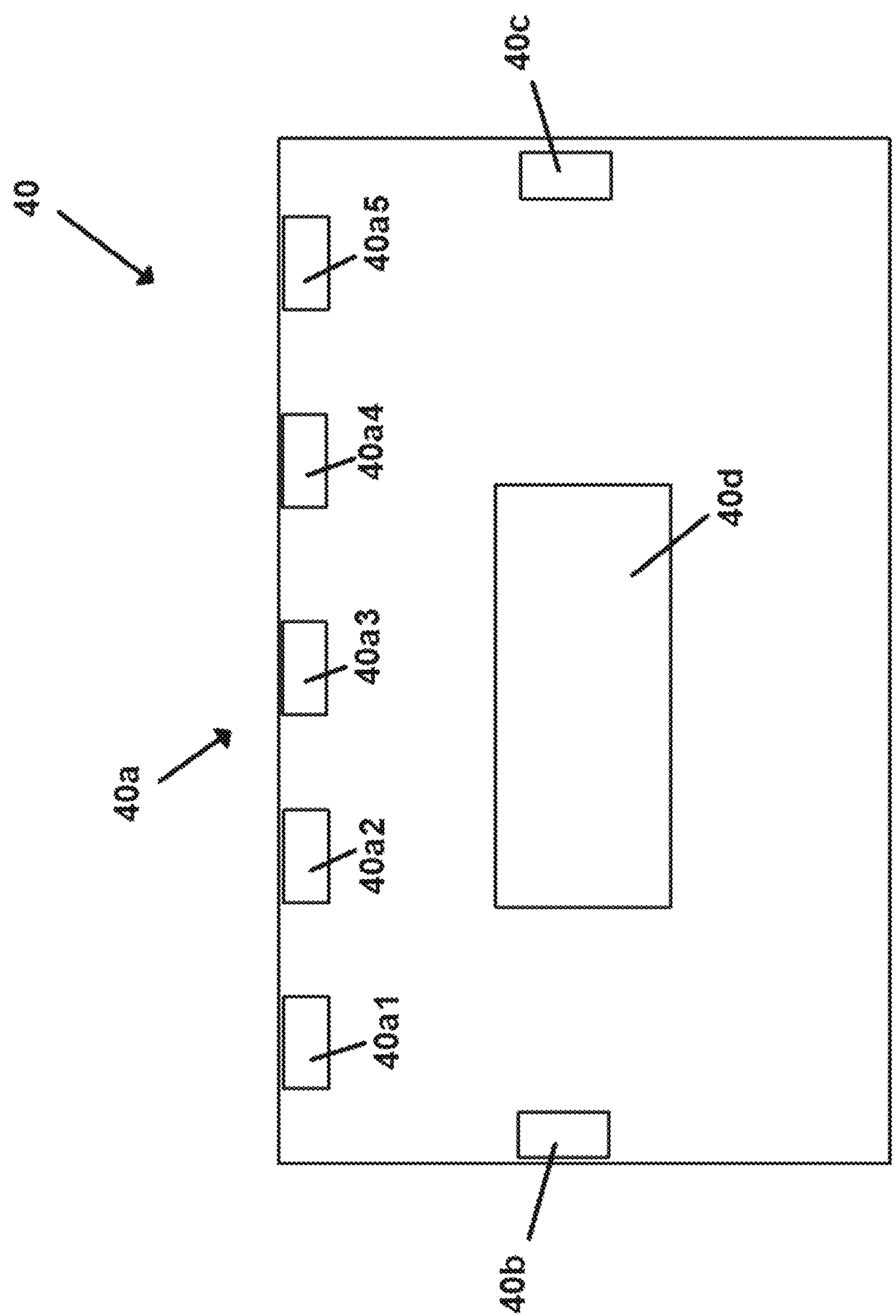
FIG. 4 is a schematic of a circuit assembly.

Turning to FIG. 4, depicted therein is circuit assembly 40 including data-power interface 40*a* with data-power port 40*al*, data-power port 40*a*2, data-power port 40*a*3, data-power port 40*a*4, and data-power port 40*a*5, DC power-only input port 40*b*, data-only port 40*c*, and circuitry 40*d*.

Figure 5:
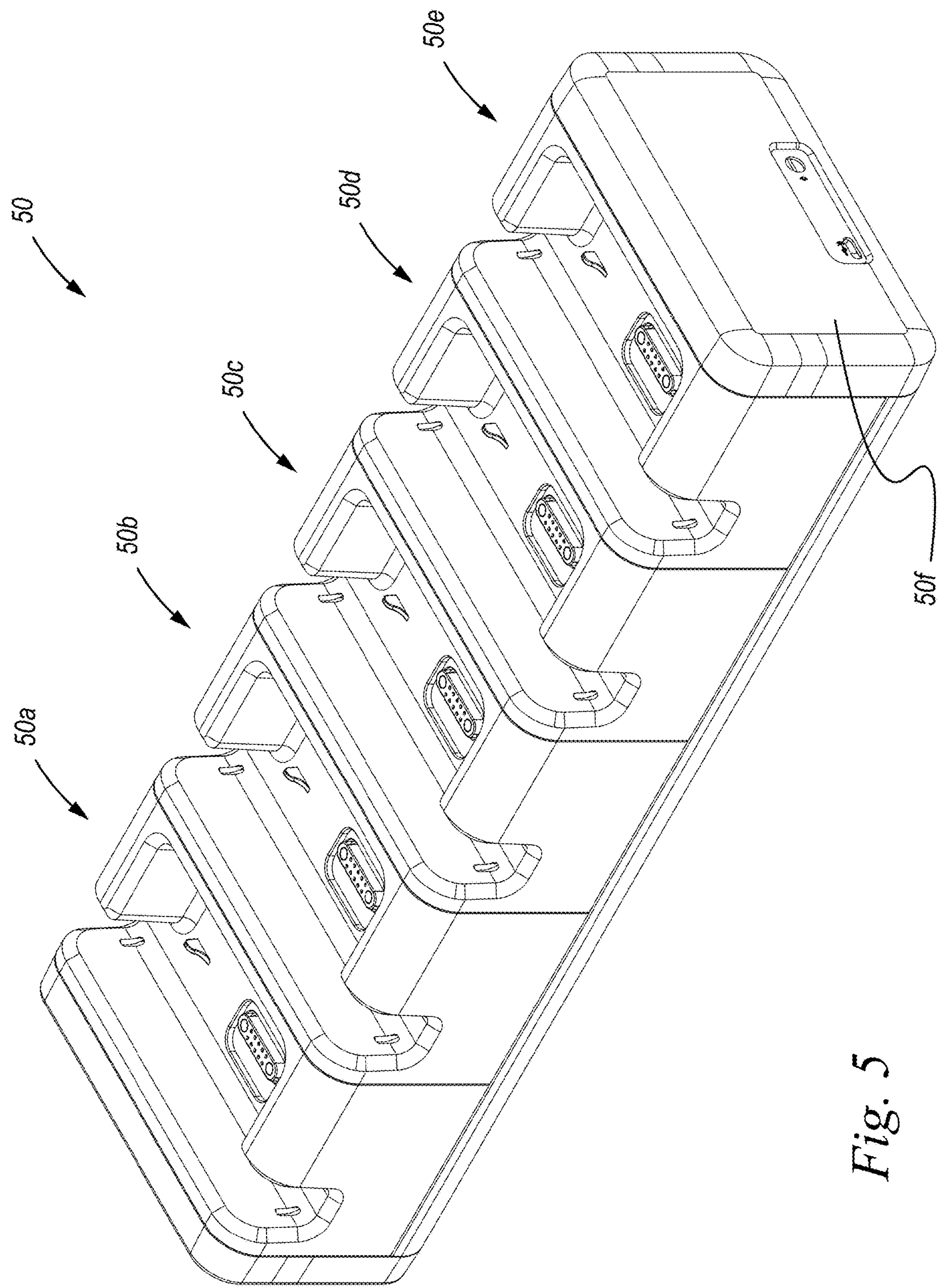
FIG. 5 is a rear perspective view of a device data-power station assembly.

Turning to FIG. 5, depicted therein is a rear perspective view of device data-power station assembly 50 including device bay portion 50*a*, device bay portion 50*b*, device bay portion 50*c*, device bay portion 50*d*, device bay portion 50*e*, and side 50*f*.

Figure 6:
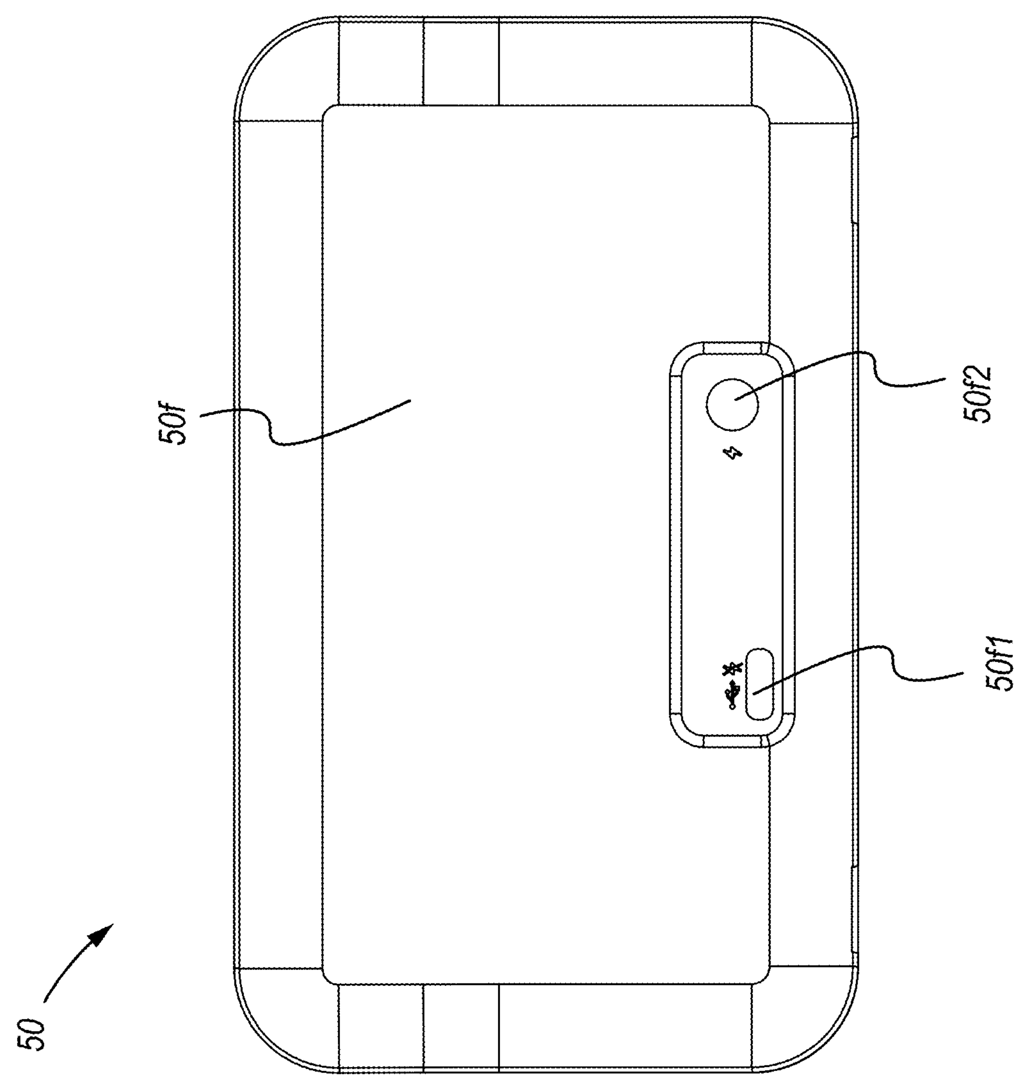
FIG. 6 is a rear elevational view of the device data-power station assembly of FIG. 5.

Turning to FIG. 6, depicted therein is a rear elevational view of device data-power station assembly 50 with data-only port 50*f*1, and DC power-only input port 50*f*2.

Figure 7:
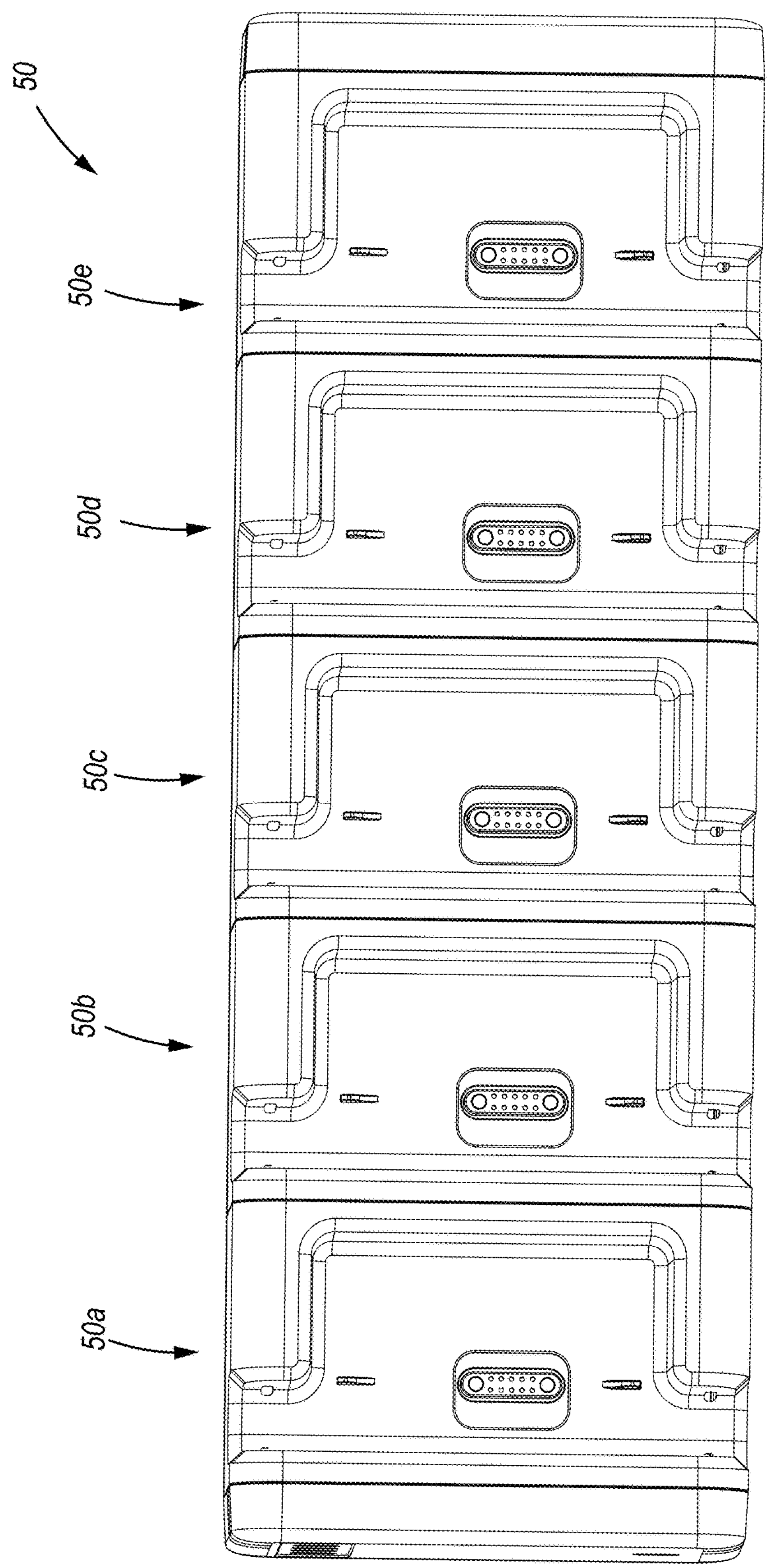
FIG. 7 is a top plan view of the device data-power station assembly of FIG. 5.

Turning to FIG. 7, depicted therein is a top plan view of device data-power station assembly 50.

Figure 8:
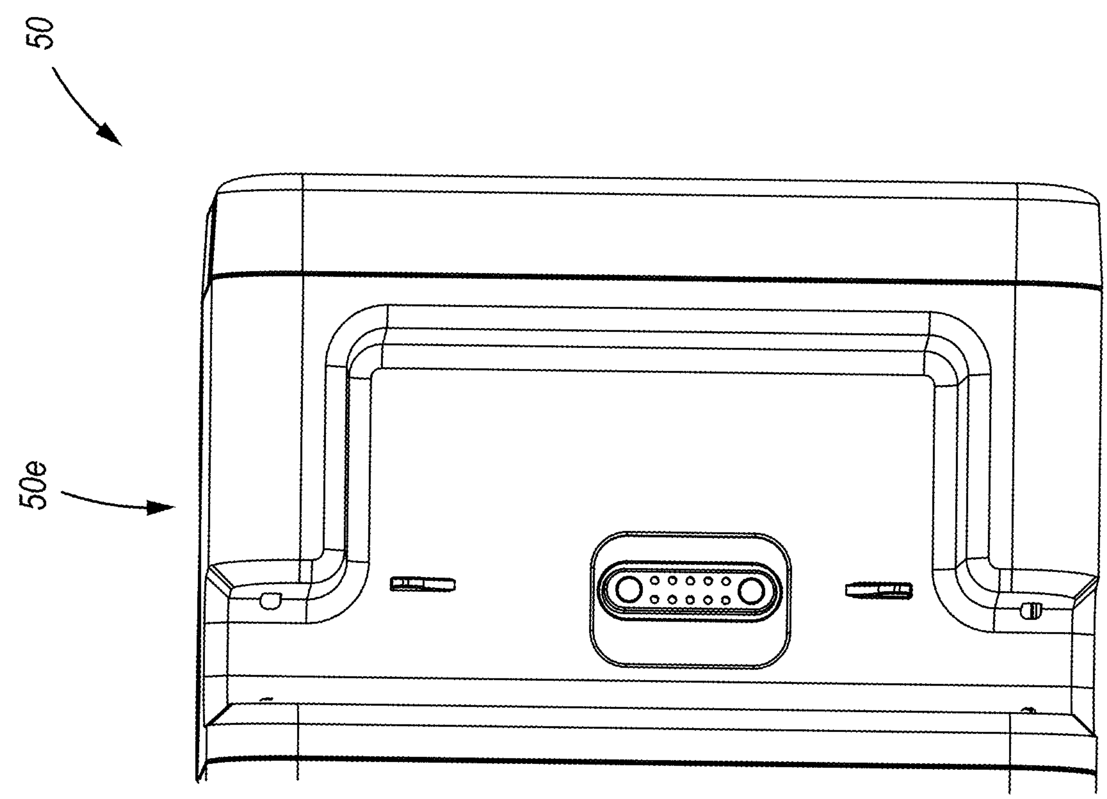
FIG. 8 is a top plan enlarged view of a device bay portion of the device data-power station assembly of FIG. 5.

Turning to FIG. 8, depicted therein is a top plan enlarged view of device bay portion 50*e* of device data-power station assembly 50.

Figure 9:
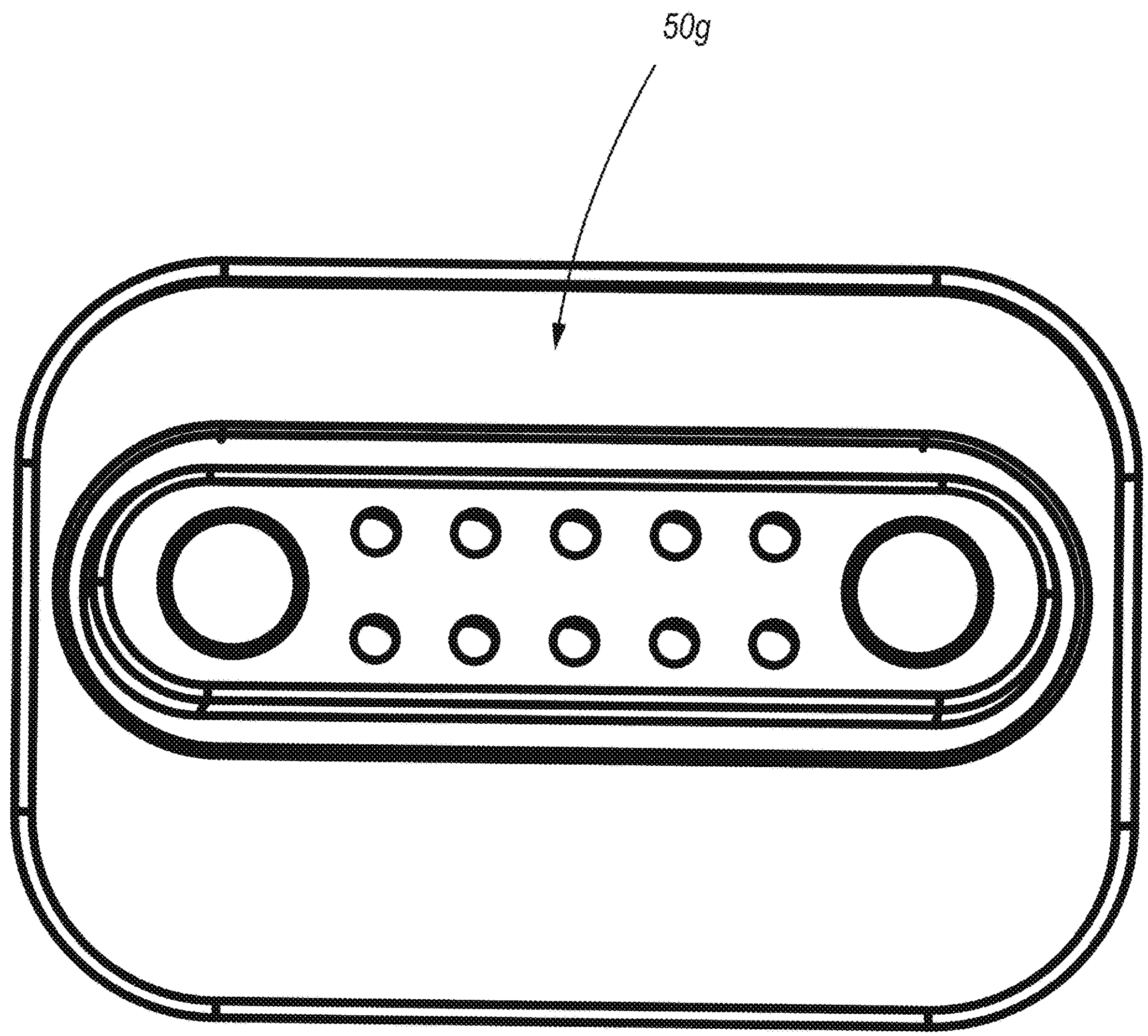
FIG. 9 is a top plan enlarged view of an interface portion of the device bay portion of FIG. 8.

Turning to FIG. 9, depicted therein is a top plan enlarged view of data-power port 50*g* of device bay portion 50*e* of device data-power station assembly 50.

Figure 10:
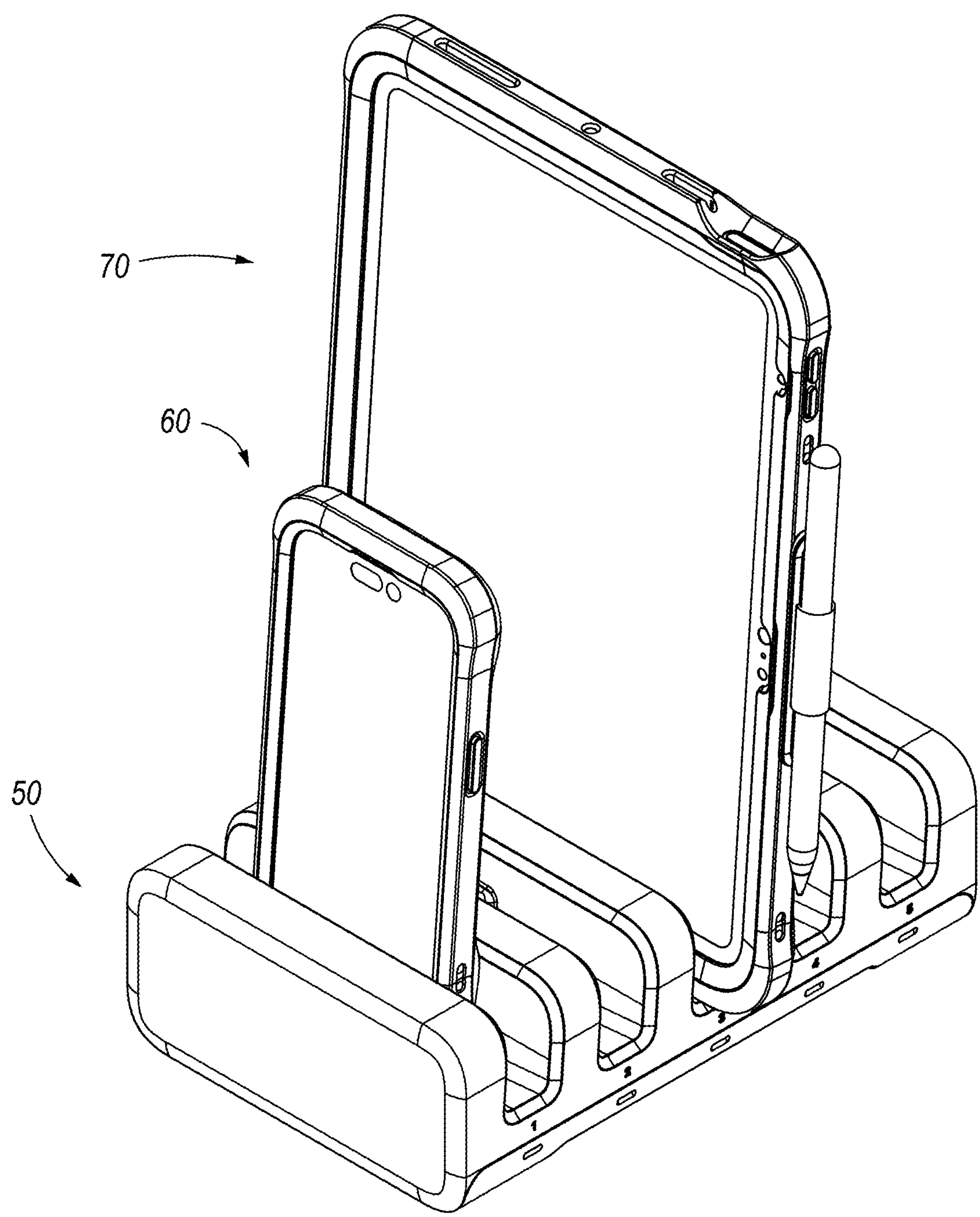
FIG. 10 is a front perspective view of the device data-power station assembly of FIG. 5 coupled with portable electronic devices.

Turning to FIG. 10, depicted therein is a front perspective view of device data-power station assembly 50 coupled with portable electronic device 60 and portable electronic device 70.

Figure 11:
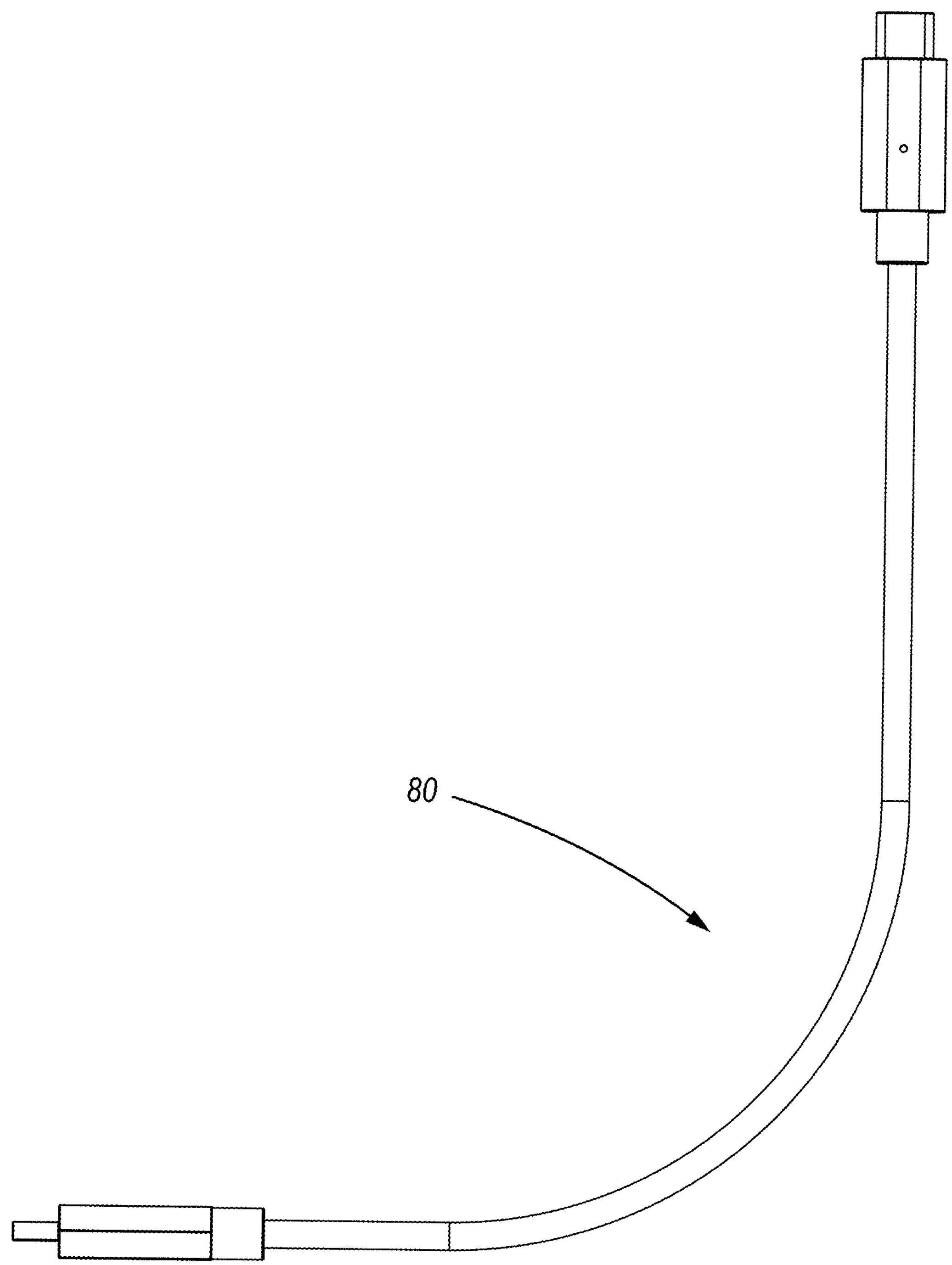
FIG. 11 a top plan view of a data-power cable.

Turning to FIG. 11, depicted therein a top plan view of data cable 80.

Figure 12:
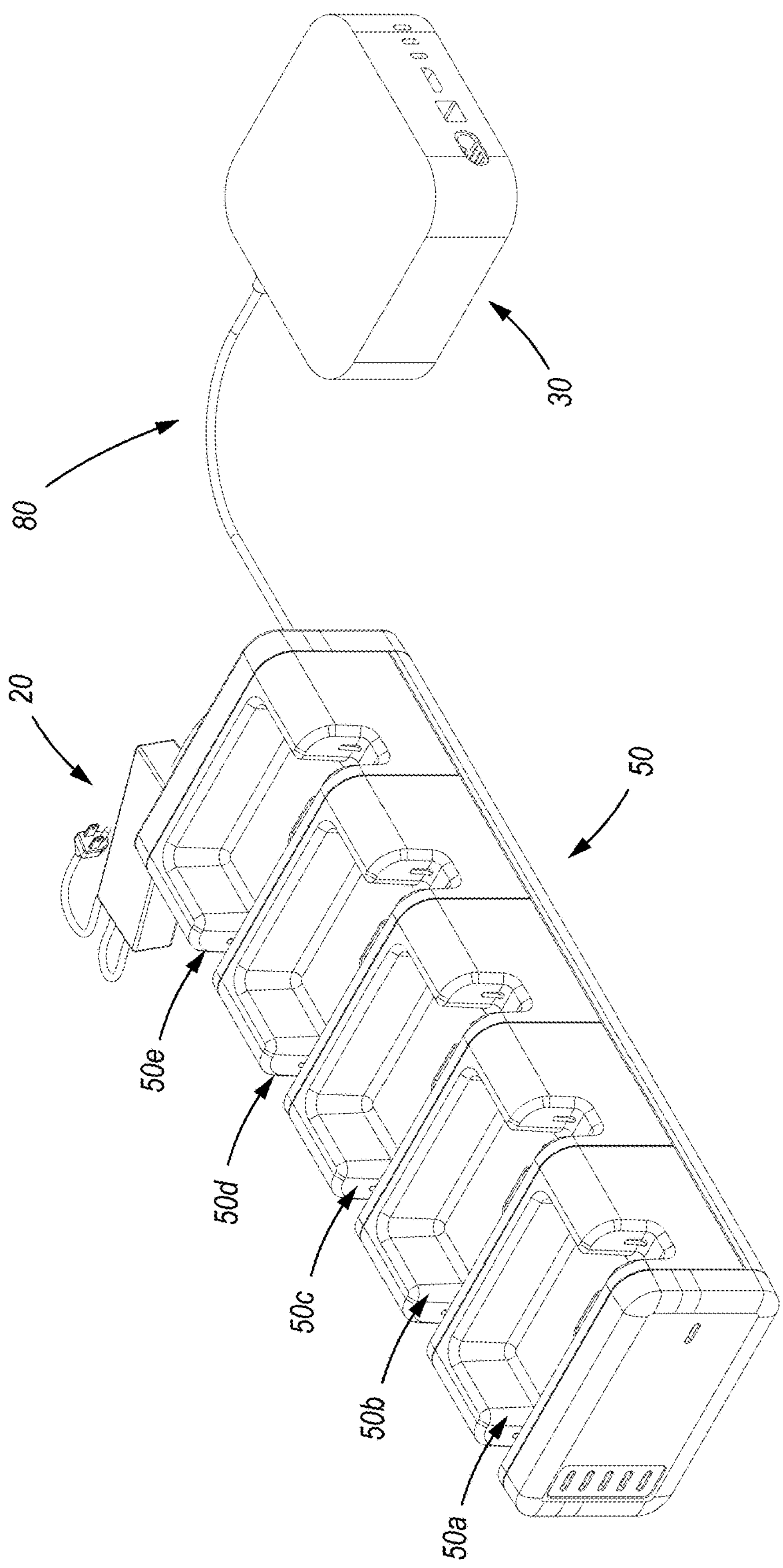
FIG. 12 is a front perspective view of device data-power station assembly of FIG. 5 coupled with the power adapter of FIG. 1 and coupled with the computer assembly of FIG. 3.

Turning to FIG. 12, depicted therein is a front perspective view of device data-power station assembly 50 coupled with power adapter 20 and computer assembly 30.

Figure 13:
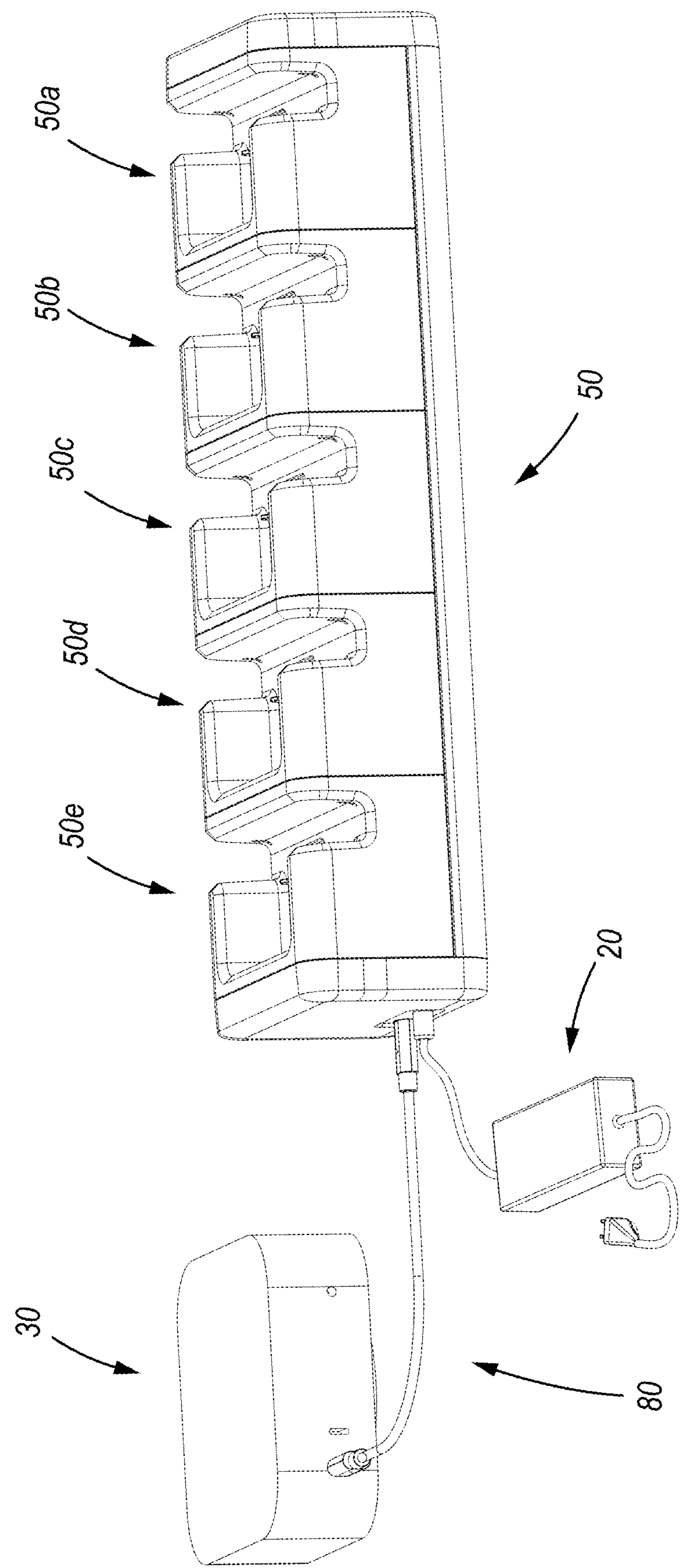
FIG. 13 is a side elevational view of device data-power station assembly of FIG. 5 coupled with the power adapter of FIG. 1 and coupled with the computer assembly of FIG. 3.

Turning to FIG. 13, depicted therein is a side elevational view of device data-power station assembly 50 coupled with power adapter 20 and computer assembly 30.

Figure 14:
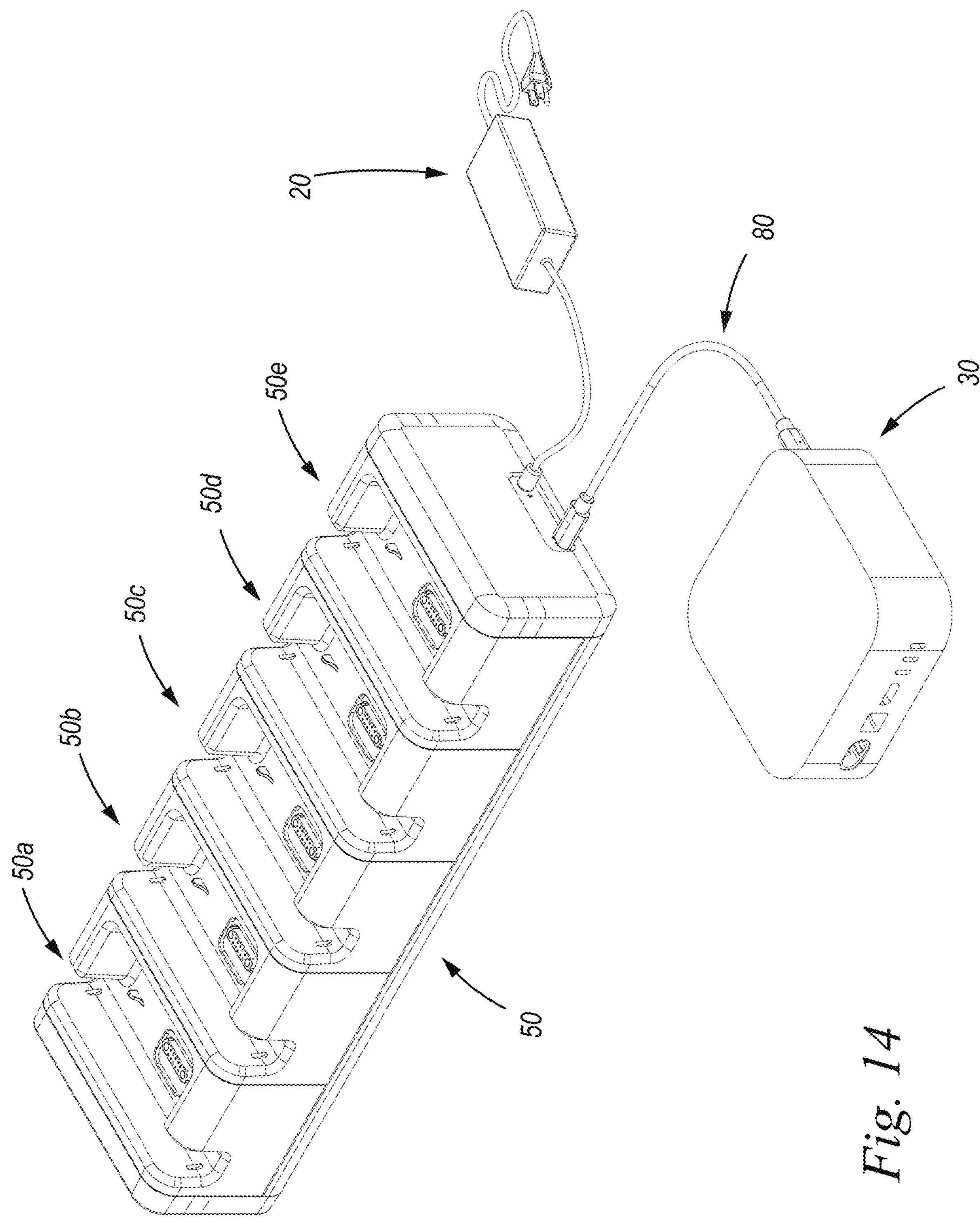
FIG. 14 is a rear perspective view of device data-power station assembly of FIG. 5 coupled with the power adapter of FIG. 1 and coupled with the computer assembly of FIG. 3.

Turning to FIG. 14, depicted therein is a rear perspective view of device data-power station assembly 50 coupled with power adapter 20 and computer assembly 30.

Figure 15:
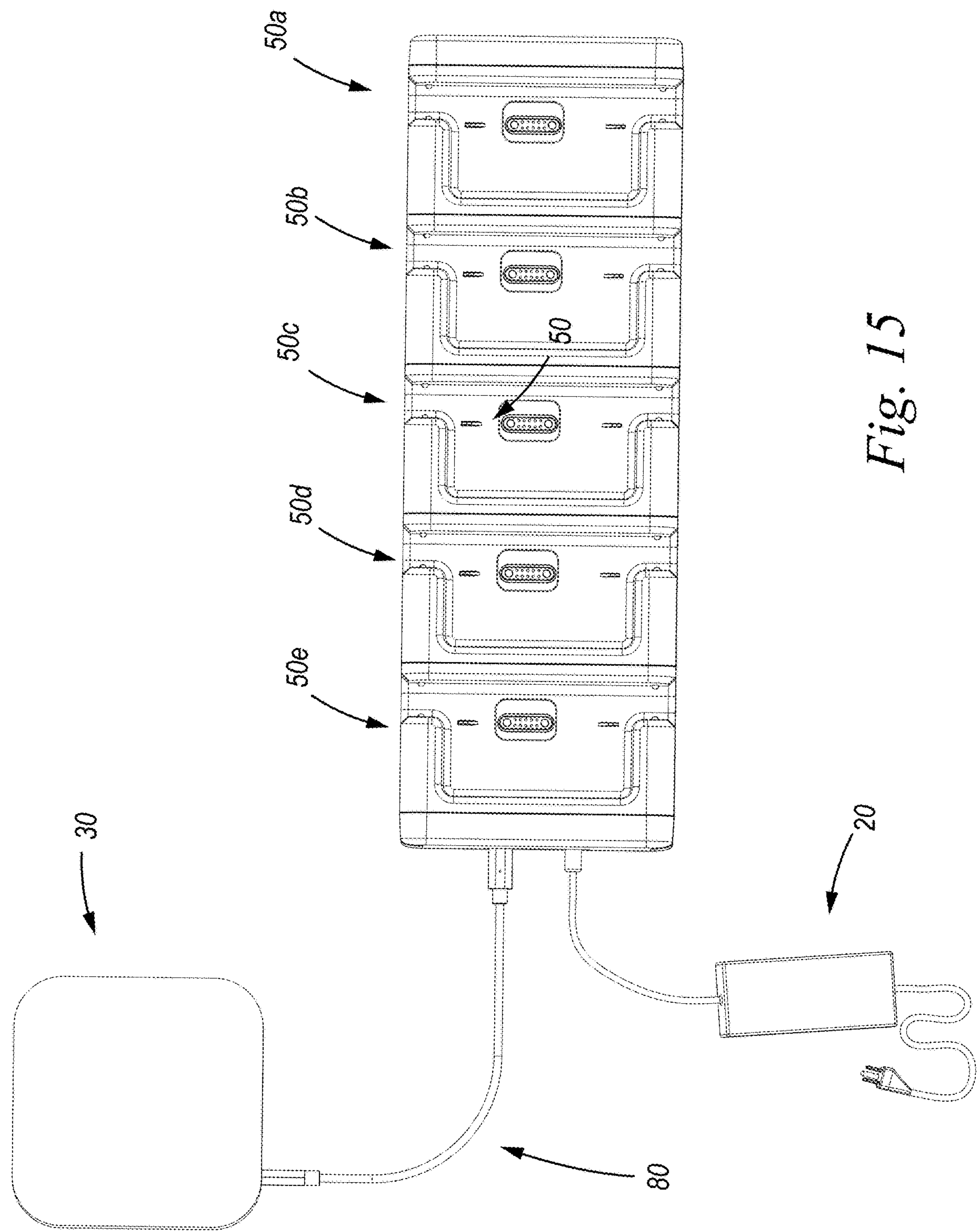
FIG. 15 is a top plan view of device data-power station assembly of FIG. 5 coupled with the power adapter of FIG. 1 and coupled with the computer assembly of FIG. 3.

Turning to FIG. 15, depicted therein is a top plan view of device data-power station assembly 50 coupled with power adapter 20 and computer assembly 30.

Figure 16:
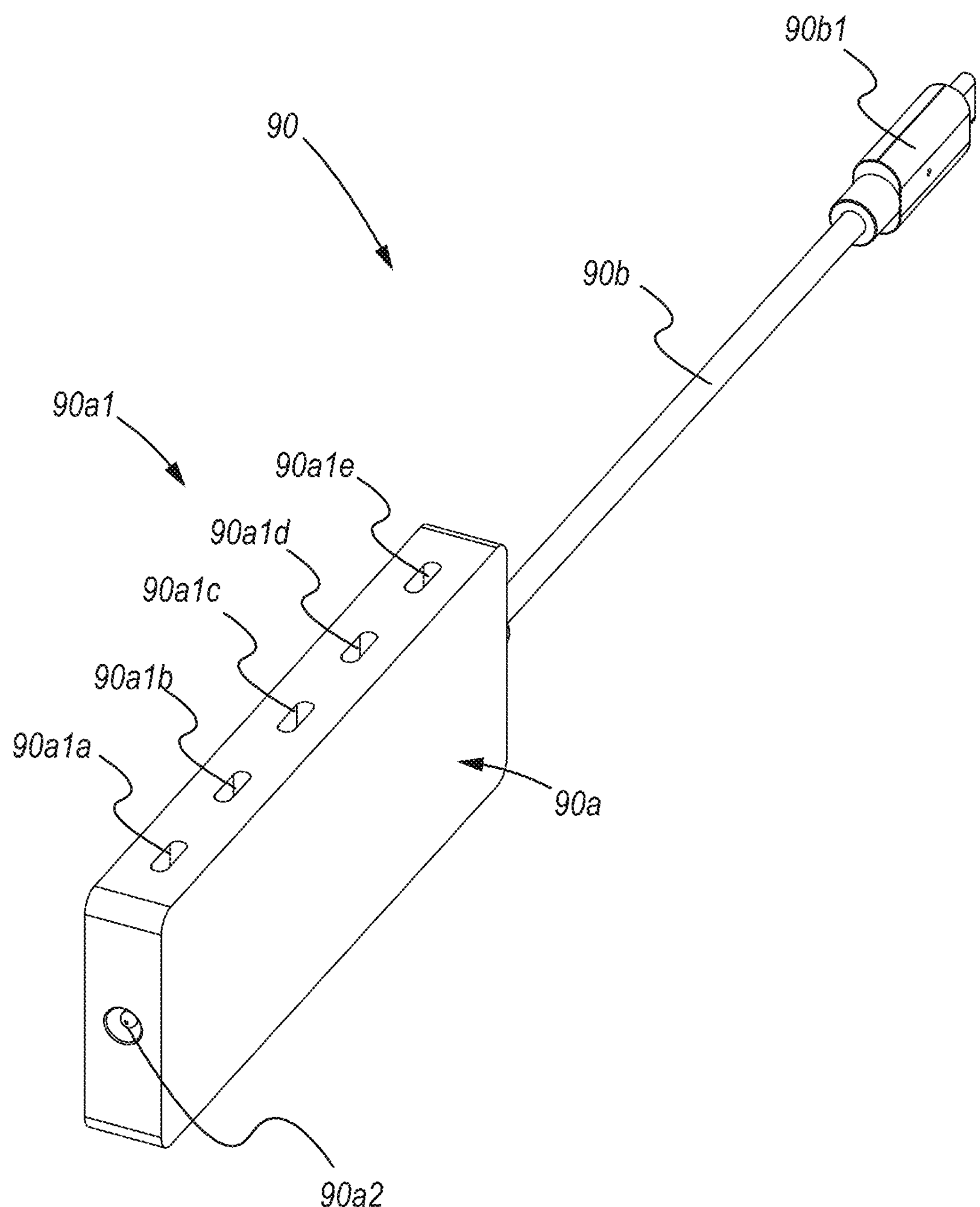
FIG. 16 is a perspective view of a device data-power dongle assembly.

Turning to FIG. 16, depicted therein is a perspective view of device data-power dongle assembly 90 including data-power dongle 90*a* with data-power interface 90*al* having data-power port 90*a*1*a*, data-power port 90*a*1*b*, data-power port 90_a_1_c_, data-power port 90_a_1_d_, and data-power port 90_a_1_e_, and with DC power-only input port 90_a_2, and including data-only cable 90_b_ with data plug 90_b_1 (e.g., also known as a type of data-only port).

Figure 17:
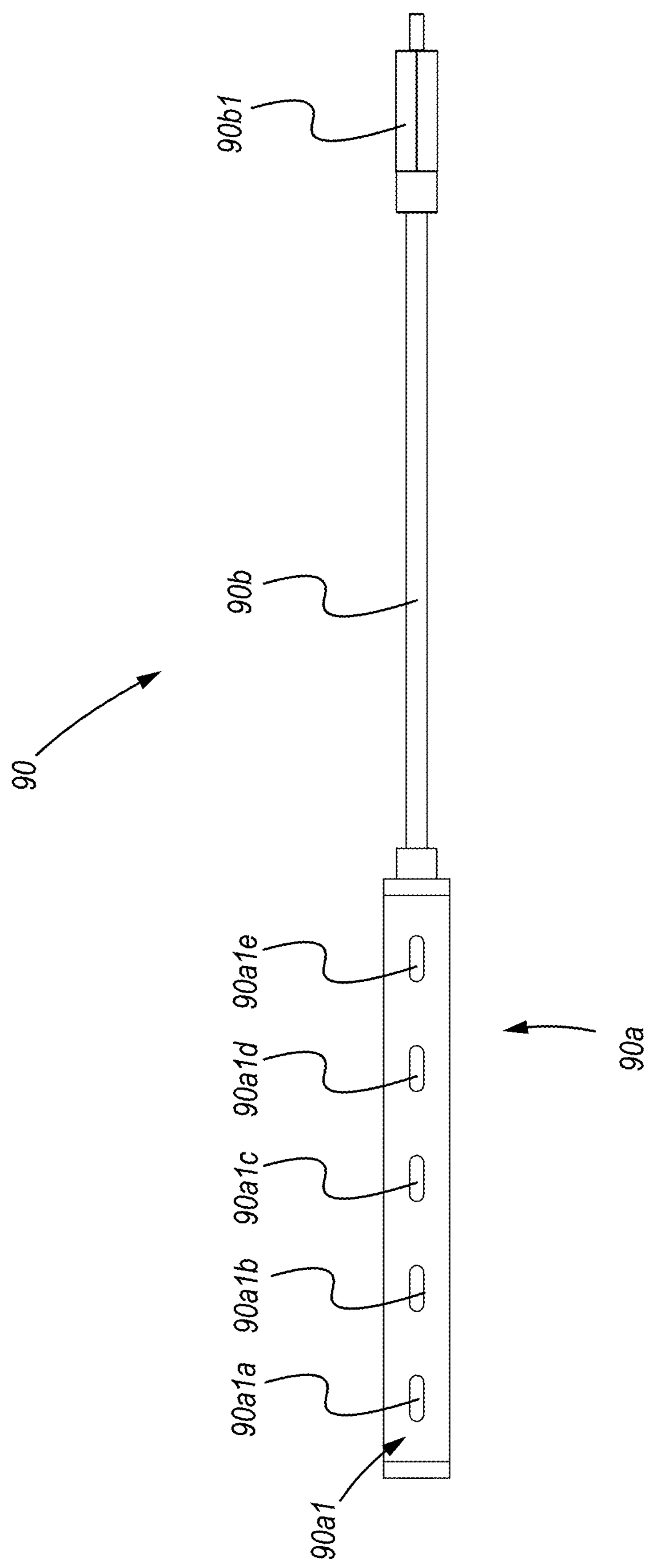
FIG. 17 is a side elevational view of the device data-power dongle assembly of FIG. 16.

Turning to FIG. 17, depicted therein is a side elevational view of device data-power dongle assembly 90.

Figure 18:
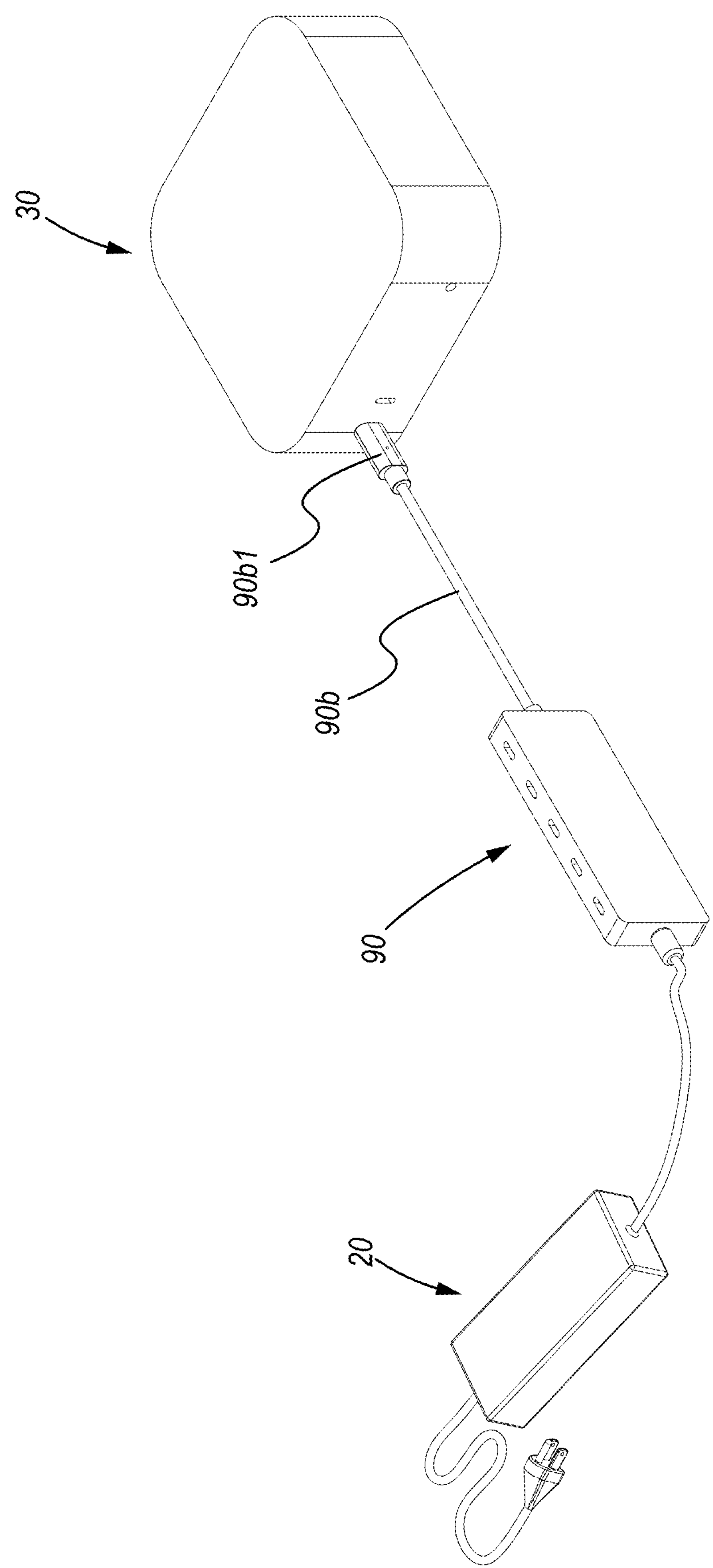
FIG. 18 is a top perspective view of device data-power dongle assembly of FIG. 16 coupled with the power adapter of FIG. 1 and coupled with the computer assembly of FIG. 3.

Turning to FIG. 18, depicted therein is a top perspective view of device data-power dongle assembly 90 coupled with power adapter 20 and coupled with computer assembly 30.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A system for at least one portable electronic device, the system comprising:

(I) at least one data-power port;

(II) a data-only port electrically coupled to the at least one data-power port; and (III) an electrical power-only input port electrically coupled to the at least one data-power port, wherein the at least one data-power port, the data-only port, and the electrical power-only input port are structurally separate from one another.

2. The system of claim 1 wherein the at least one data-power port, the data-only port and the electrical power-only input port are incorporated into a device data-power station assembly for the at least one portable electronic device.

3. The system of claim 1 wherein the at least one data-power port, the data-only port and the electrical power-only input port are incorporated into a device data-power dongle assembly for the at least one portable electronic device.

4. The system of claim 1 wherein the at least one data-power port is of a universal serial bus type.

5. The system of claim 1 wherein the electrical power-only input port is of a direct current type.

6. The system of claim 1 wherein the data-only port is of a universal serial bus type.

7. The system of claim 1 wherein the at least one data-power port, the data-only port, and the electrical power-only input port are hardwired together.

8. The system of claim 1 wherein the at least one data-power port, the data-only port, and the electrical power-only input port are coupled to a printed circuit board.

9. A system for at least one portable electronic device, the system comprising:

(I) a device data-power station assembly for coupling with the at least one portable electronic device, the station assembly including (A) at least one data-power port;

(B) a data-only port electrically coupled to the at least one data-power port; and (C) an electrical power-only input port electrically coupled to the at least one data-power port, wherein the at least one data-power port, the data-only port, and the electrical power-only input port are structurally separate from one another.

10. The system of claim 9 wherein the at least one data-power port is of a universal serial bus type.

11. The system of claim 9 wherein the electrical power-only input port is of a direct current type.

12. The system of claim 9 wherein the data-only port is of a universal serial bus type.

13. The system of claim 9 wherein the at least one data-power port, the data-only port, and the electrical power-only input port are hard-wired together.

14. The system of claim 9 wherein the at least one data-power port, the data-only port, and the electrical power-only input port are coupled to a printed circuit board.

15. A system for at least one portable electronic device, the system comprising:

(I) a device data-power dongle assembly for holding the at least one portable electronic device, the device data-power dongle assembly including (A) at least one data-power port;

(B) a data-only port electrically coupled to the at least one data-power port; and (C) an electrical power-only input port electrically coupled to the at least one data-power port, wherein the at least one data-power port, the data-only port, and the electrical power-only input port are structurally separate from one another.

16. The system of claim 15 wherein the at least one data-power port is of a universal serial bus type.

17. The system of claim 15 wherein the electrical power-only input port is of a direct current type.

18. The system of claim 15 wherein the data-only port is of a universal serial bus type.

19. The system of claim 15 wherein the at least one data-power port, the data-only port, and the electrical power-only input port are hard-wired together.

20. The system of claim 15 wherein the at least one data-power port, the data-only port, and the electrical power-only input port are coupled to a printed circuit board.

* * * * *